United States Patent [19]

Uranishi et al.

[11] Patent Number: 4,651,889
[45] Date of Patent: Mar. 24, 1987

[54] FUEL TANK NOZZLE HAVING A DUAL PURPOSE VALVE

[75] Inventors: Koji Uranishi, Susono; Takaaki Ito, Mishima; Toshio Tanahashi, Susono, all of Japan

[73] Assignee: Toyota Jidosha Kabushiki Kaisha, Aichi, Japan

[21] Appl. No.: 715,171

[22] Filed: Mar. 22, 1985

[30] Foreign Application Priority Data

| Mar. 23, 1984 | [JP] | Japan | 59-54439 |
| Mar. 23, 1984 | [JP] | Japan | 59-54441 |
| Mar. 23, 1984 | [JP] | Japan | 59-54443 |
| Mar. 24, 1984 | [JP] | Japan | 59-55240 |

[51] Int. Cl.⁴ .............................. F02M 33/02
[52] U.S. Cl. ............................ 220/85 VR; 55/387; 123/519; 137/588; 141/292; 220/85 VS; 220/85 V; 220/86 R; 280/5 A
[58] Field of Search ................ 220/85 S, 85 P, 85 V, 220/85 SP, 85 VR, 85 VS, 85 R, 86 R; 137/582, 587, 588; 55/387, 182; 123/516, 518, 519; 141/292, 300, 301, 350; 280/5 A

[56] References Cited

U.S. PATENT DOCUMENTS

| 2,613,013 | 10/1952 | Van Pelt | 220/86 R |
| 3,477,611 | 11/1969 | Niles |  |
| 3,478,922 | 11/1969 | Mole et al. |  |
| 3,617,034 | 11/1971 | Skinner | 123/518 X |
| 3,693,825 | 9/1972 | Richman | 220/85 B |
| 3,748,829 | 6/1973 | Joyce et al. |  |
| 3,854,911 | 12/1974 | Walker | 55/387 |
| 3,884,204 | 5/1975 | Krautwurst et al. | 123/519 |
| 3,907,153 | 9/1975 | Mutty | 220/86 R |
| 4,000,727 | 1/1977 | Walker | 123/519 |
| 4,044,913 | 8/1977 | Brunnert | 220/86 R |
| 4,135,562 | 1/1979 | Martineau et al. | 220/86 R X |
| 4,142,647 | 3/1979 | Walters | 220/85 S |
| 4,191,154 | 3/1980 | Shibata | 123/519 |
| 4,232,715 | 11/1980 | Pyle | 141/292 X |
| 4,424,839 | 1/1984 | Otani et al. | 220/86 R X |
| 4,572,394 | 2/1986 | Tanahashi et al. | 220/86 R |

FOREIGN PATENT DOCUMENTS

| 52-158214 | 12/1977 | Japan |  |
| 54-21610 | 7/1979 | Japan |  |
| 56-128221 | 10/1981 | Japan |  |
| 1259732 | 1/1972 | United Kingdom | 137/588 |

Primary Examiner—William Price
Assistant Examiner—Bryon Gehman
Attorney, Agent, or Firm—Finnegan, Henderson, Farabow, Garrett & Dunner

[57] ABSTRACT

A fuel tank comprising a fuel inlet pipe and a cap detachably attached to the fuel inlet of the fuel inlet pipe. A valve port interconnecting the interior of the fuel tank to a canister is formed in the fuel inlet pipe. A control valve controlling the opening operation of the valve port is arranged in the fuel inlet pipe. The control valve is normally closed. When a fuel pump nozzle is inserted into the fuel inlet, the control valve automatically opens, and the fuel vapor in the fuel tank is fed into the canister via the valve port.

21 Claims, 11 Drawing Figures

FUEL TANK NOZZLE HAVING A DUAL PURPOSE VALVE

BACKGROUND OF THE INVENTION

1. Field of the Invention

The present invention relates to a fuel tank for use in a motor vehicle.

2. Description of the Related Art

A motor vehicle driven by an internal combustion engine is normally equipped with a fuel tank. When it becomes necessary to replenish the fuel tank with fuel, the cap attached to the fuel inlet of the fuel tank must first be detached, to allow the insertion of a fuel pump nozzle. After the fuel pump nozzle is inserted into the fuel inlet of the fuel tank, fuel is fed into the fuel tank from the fuel pump nozzle. However, when the level of the fuel in the fuel tank is low, the space in the fuel tank above the surface of the liquid fuel is filled with a large amount of fuel vapor under pressure. Consequently, when the cap is detached from the fuel inlet of the fuel tank, the fuel vapor in the fuel tank is forced out of the fuel tank into the outside air, causing air pollution. In addition, when fuel is fed into the fuel tank from the fuel pump nozzle, the fuel spouted from the nozzle comes into violent contact with and agitates the fuel in the fuel tank, causing bubbles to form in the fuel in the fuel tank. The collapsing of these bubbles causes further amounts of fuel vapor to be generated in the fuel tank, and this fuel vapor also escapes from the fuel inlet of the fuel tank, causing more air pollution.

SUMMARY OF THE INVENTION

An object of the present invention is to provide a fuel tank capable of alleviating air pollution caused by the fuel vapor in the tank by preventing the fuel vapor in the fuel tank from escaping to the outside air when a fuel filling operation is carried out.

Additional objects and advantages of the present invention will be set forth in the description that follows and in part will be obvious from the description or may be learned by practice of the invention. The objects and advantages of the invention may be realized and obtained by the apparatus particularly pointed out in the appended claims.

Thus, according to the present invention, there is provided a fuel tank for use in a motor vehicle, comprising: a fuel inlet pipe connected to the fuel tank and having a fuel inlet into which a fuel pump nozzle is inserted; a cap detachably attached to the fuel inlet; a canister having an activated carbon contained therein; and normally closed valve means controlling the vapor connection between an interior of the fuel tank and the canister and cooperating with the fuel pump nozzle for connecting the interior of the fuel tank to the canister when the fuel pump nozzle is inserted into the fuel inlet.

The present invention may be more fully understood from the description of preferred embodiments of the invention set forth below, together with the accompanying drawings.

The accompanying drawings, which are incorporated in and constitute a part of this specification, illustrate presently preferred embodiments of the invention and, together with the description, serve to explain the principles of the invention.

DESCRIPTION OF THE PREFERRED EMBODIMENTS

Figure 1:
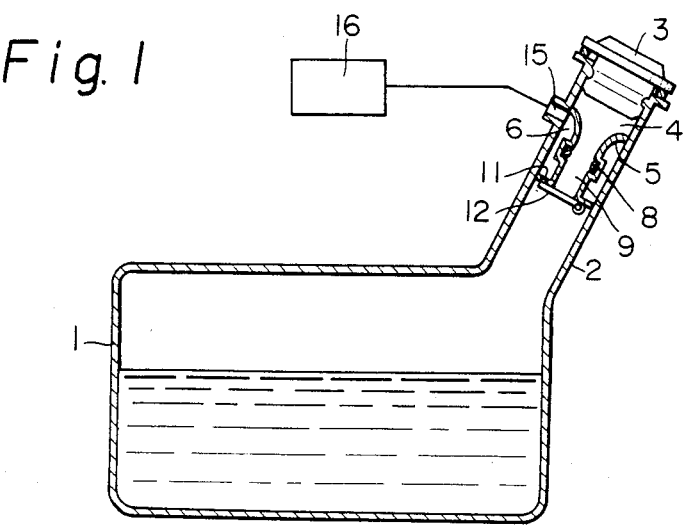
FIG. 1 is a cross-sectional side view of a first embodiment of a fuel tank according to the present invention.

Reference will now be made in detail to presently preferred embodiments of the invention, examples of which are illustrated in the accompanying drawings. Throughout the drawings, like reference characters are used to designate like elements.

Figure 2:
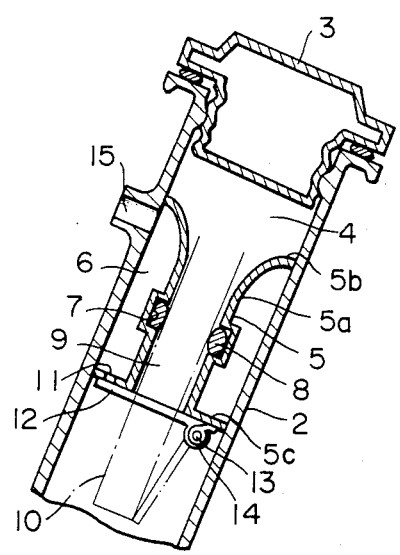
FIG. 2 is an enlarged cross-sectional side view of a portion of the fuel tank illustrated in FIG. 1.

A preferred embodiment of the fuel tank is illustrated in FIG. 1. A fuel tank 1 having a fuel inlet pipe 2 with a cap 3 detachably attached to a fuel inlet 4 of the fuel inlet pipe 2 is shown. Referring to FIGS. 1 and 2, a hollow cylindrical nozzle guide 5 is fixed to the inner wall of the fuel inlet pipe 2. This nozzle guide 5 comprises a hollow cylindrical portion 5a having an uniform cross-section, a funnel-shaped inlet end portion 5b diverging toward the cap 3, and an annular end plate 5c extending perpendicular to the axis of the fuel inlet pipe 2. A fuel vapor passage 6 is formed between the nozzle guide 5 and the fuel inlet pipe 2. An annular groove 7 is formed on the central portion of the hollow cylindrical portion 5a, and a seal member 8 such as an O ring is fitted into the annular groove 7. The hollow cylindrical portion 5a forms therein a nozzle insertion passage 9 having a substantially uniform cross-section. As illustrated by the dash-dot line in FIG. 2, the fuel pump nozzle 10 is inserted into the nozzle insertion passage 9 when a fuel filling operation is to be carried out. The inner diameter of the seal member 8 is determined in such a manner that the seal member 8 comes into sealing contact with the outer wall of the fuel pump nozzle 10 when the fuel pump nozzle 10 is inserted into the nozzle insertion passage 9. Valve ports 11 are formed on the annular end plate 5c of the nozzle guide 5, and a control valve member 12 for controlling the opening operation of the valve ports 11 and the nozzle insertion passage 9 is pivotally connected to the lower wall of the annular end plate 5c by means of a pivot pin 13. The control valve member 12 is continuously biased in the clockwise direction by a coil spring 14 which is arranged axially around the pivot pin 13. Thus, the valve ports 11 and the nozzle insertion passage 9 are normally closed by the control valve member 12. A fuel vapor outlet 15 is formed at the uppermost portion of the fuel vapor passage 6 and connected to a canister 16 containing charcoal.

When the fuel inlet 4 is closed by the cap 3 as illustrated in FIGS. 1 and 2, the valve ports 11 and the nozzle insertion passage 9 are closed by the control valve member 12. Consequently, the fuel vapor in the fuel tank 1 is not able to escape into the canister 16, and thus the interior of the fuel tank 1 is filled with fuel vapor under pressure.

When the cap 3 is detached from the fuel inlet 4, since the nozzle insertion passage 9 remains closed by the control valve member 12, there is no danger that the fuel vapor in the fuel tank 1 will escape to the outside air. Then, as illustrated by the dash-dot line in FIG. 2, the fuel pump nozzle 10 is inserted into the nozzle insertion passage 9. At this time, the tip of the fuel pump nozzle 10 engages with the control valve member 12 and causes the control valve member 12 to rotate in the counterclockwise direction as illustrated by the dash-dot line in FIG. 2 and, as a result, the control valve member 12 opens the valve ports 11. At this time, the fuel vapor in the fuel tank 1 is fed into the canister 16 via the valve ports 11, the fuel vapor passage 6, and the fuel vapor outlet 15. Then, fuel is fed into the fuel tank 1 from the fuel pump nozzle 10. The fuel spouted from the fuel pump nozzle 10 comes into violent contact with the fuel in the fuel tank 1, causing the fuel in the fuel tank 1 to bubble and vaporize. However, at this time, since the valve ports 11 are opened and, in addition, the interior of the fuel tank 1 is isolated from the outside air by the seal member 8, the fuel vapor generated in the fuel tank 1 is fed into the canister 16 via the valve ports 11. When the fuel tank is full, the fuel pump nozzle 10 is removed from the fuel inlet 4, thus releasing the control valve member 12. At this time, the valve ports 11 and the nozzle insertion passage 9 are closed again by the control valve member 12, and thus there is no danger that the fuel vapor in the fuel tank 1 will escape to the outside air.

The fuel vapor fed into the canister 16 is absorbed by the activated carbon in the canister 16, and the fuel vapor absorbed by the activated carbon is drawn into the intake manifold (not shown) via the fuel vapor conduit (not shown) at a predetermined engine operating state.

Figure 3:
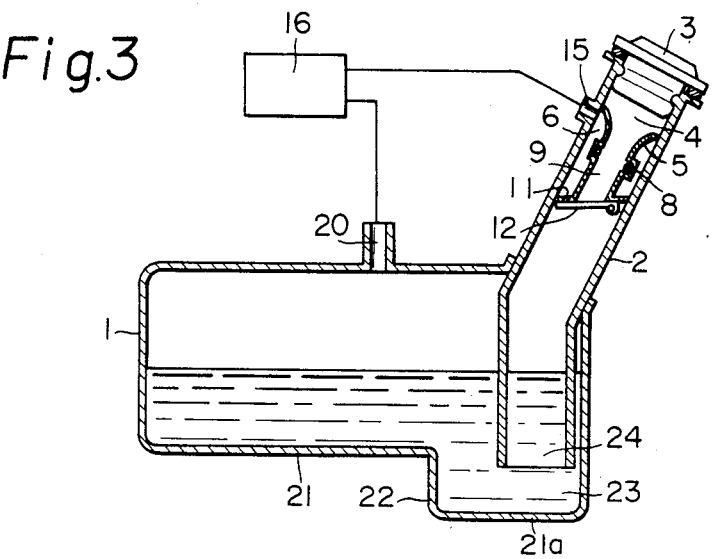
FIG. 3 is a cross-sectional side view of a second embodiment of a fuel tank according to the present invention.
Figure 4:
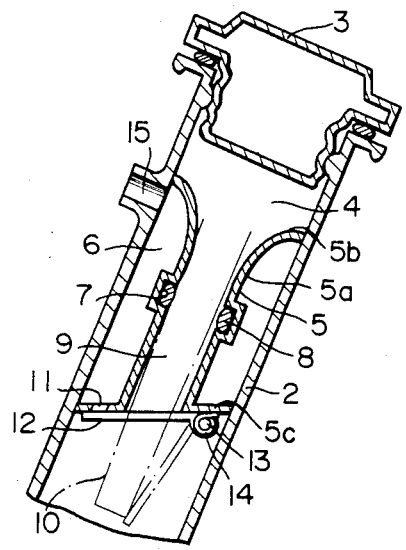
FIG. 4 is an enlarged cross-sectional side view of a portion of the fuel tank illustrated in FIG. 3.

FIGS. 3 and 4 illustrate a second embodiment of the present invention. In this embodiment, a fuel vapor outlet 20 is formed on the upper wall of the fuel tank 1 and connected to the canister 16. Consequently, the fuel vapor generated in the fuel tank 1 is fed into the canister 16. In addition, in this embodiment, a portion 21a of the lower wall 21 of the fuel tank 1 is expanded downward, and a small chamber 23 surrounded by a vertical wall 22 of the fuel tank 1 is formed above the expanded portion 21a. The fuel inlet pipe 2 extends downward in the fuel tank 1 to the interior of the small chamber 23, and the fuel outlet 24 of the fuel inlet pipe 2 is open to the interior of the small chamber 23. In addition, in this embodiment, as illustrated in FIGS. 3 and 4, the annular end plate 5c of the nozzle guide 5 is arranged at an oblique angle relative to the axis of the fuel inlet pipe 2 so that the fuel pump nozzle 10 can be easily inserted into the fuel inlet pipe 2. In this embodiment, the fuel vapor generated in the fuel tank 1 is continuously fed into the canister 16, and an extremely small amount of the fuel vapor in the fuel inlet pipe 2 is fed into the canister 16 via the fuel vapor passage 6 when the fuel pump nozzle 10 is inserted into the nozzle insertion passage 9. Therefore, it is possible to reduce the volume of the canister 16 and thus minimize the size thereof. In addition, when the control valve 12 begins to be opened by the fuel pump nozzle 10, since a small clearance exists between the fuel pump nozzle 10 and the seal member 8, there is a danger that the fuel vapor in the fuel inlet pipe 2 will escape to the outside air via the small clearance. However, at this time, only a very small part of the fuel vapor in the fuel inlet pipe 2, which part has not been fed into the canister 16, escapes to the outside air, and thus the amount of the fuel vapor actually escaping to the outside air becomes extremely small. Furthermore, when the fuel is fed into the fuel tank 1 from the fuel pump nozzle 10, only the fuel in the small chamber 23 is agitated and forms bubbles. Consequently, the amount of fuel vapor generated by this bubbling is small, and thus the amount of the fuel vapor that will escape to the outside air via the small clearance between the fuel pump nozzle 10 and the seal member 8 is extremely small when the fuel pump nozzle 10 is removed.

Figure 5:
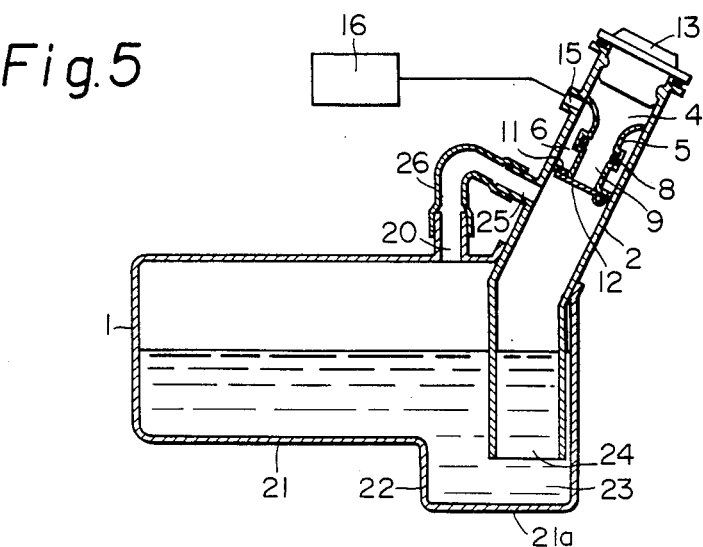
FIG. 5 is a cross-sectional side view of a third embodiment of a fuel tank according to the present invention.
Figure 6:
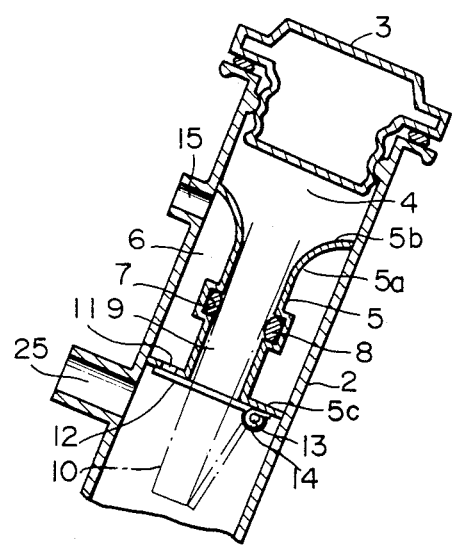
FIG. 6 is an enlarged cross-sectional side view of a portion of the fuel tank illustrated in FIG. 5.

FIGS. 5 and 6 illustrate a third embodiment of the present invention. In this embodiment, a fuel vapor outlet 25 is formed on the inner wall of the fuel inlet pipe 2. The fuel vapor outlet 25 is located near to and beneath the valve ports 11, and is connected via a connecting hose 26 to another fuel vapor outlet 20 formed on the upper wall of the fuel tank 1.

In this embodiment, when the control valve 12 is rotated in the counter clockwise direction by the fuel pump nozzle 10 and opens the valve ports 11, the fuel vapor in the fuel tank 1 is fed into the canister 16 via the vapor fuel outlet 20, the connecting hose 26, the vapor fuel outlet 25, the valve ports 11, and the fuel vapor passage 6. Then, the fuel is fed from the fuel pump nozzle 10 into the small chamber 23. At this time, if the small chamber 23 is filled with fuel, the fuel fed from the fuel pump nozzle 10 comes into violent contact with the fuel located in the fuel inlet pipe 2. Consequently, at this time, only the fuel located in the fuel inlet pipe 2 forms bubbles and vaporizes, and thus the amount of the fuel vapor generated by bubbling is small. Where the fuel remains only in the bottom portion of the small chamber 23, the entire amount of fuel in the small chamber 23 bubbles and vaporizes when the fuel is fed from the fuel pump nozzle 10. However, the volume of the small chamber 23 is correspondingly small, and thus the amount of fuel vapor generated by the bubbling is also small. As mentioned above, when the fuel is fed into the fuel tank 1 from the fuel inlet pipe 2, a small amount of fuel vapor is generated in the fuel tank 1. However, at this time, since the interior of the fuel tank 1 is isolated from the outside air by means of the seal member 8, the small amount of fuel vapor thus generated is fed into the canister 16 via the valve ports 11.

Figure 7:
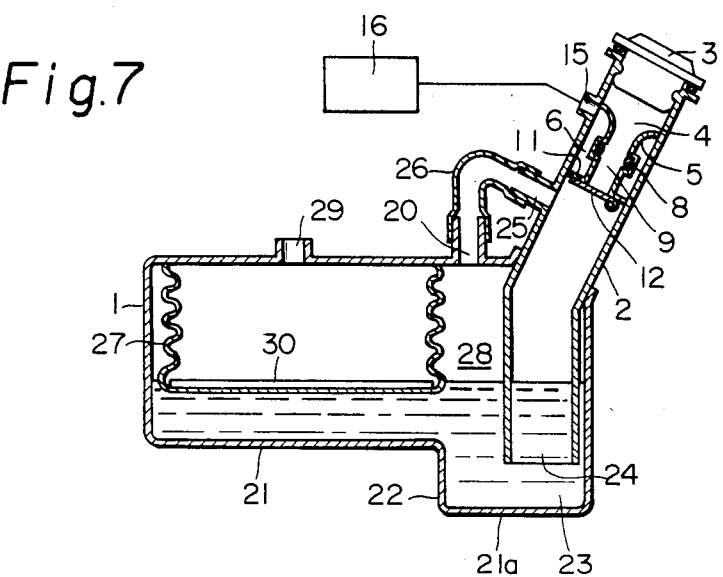
FIG. 7 is a cross-sectional side view of fourth embodiment of a fuel tank according to the present invention.
Figure 8:
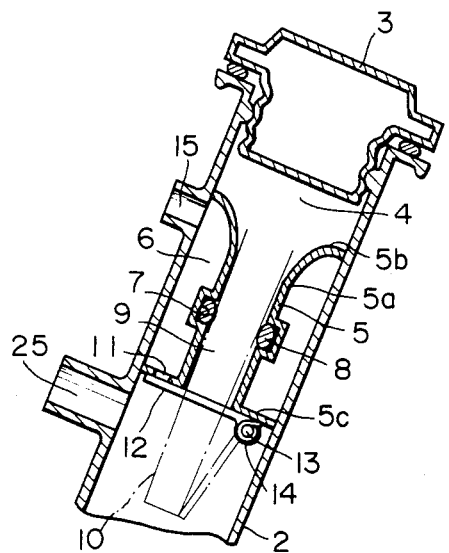
FIG. 8 is an enlarged cross-sectional side view of a portion of the fuel tank illustrated in FIG. 7.

FIGS. 7 and 8 illustrate a fourth embodiment of the present invention. In this embodiment, a volume-variable bag 27 made of a flexible material such as rubber is inserted into the upper space 28 of the fuel tank 1. The interior of the bag 27 is open to the outside air via an air hole 29 formed on the upper wall of the fuel tank 1. The upper end portion of the bag 27 is fixed in an air-tight manner to the upper wall of the fuel tank 1, to prevent the fuel vapor in the fuel tank 1 from entering the interior of the bag 27. A flat plate 30 having a relatively light weight and made of, for example, plastic, is fixed to the inner bottom wall of the bag 27. The bottom wall of the bag 27 floats on the liquid surface of the fuel in the fuel tank 1, and thus, when the level of the liquid surface of the fuel in the fuel tank 1 is changed, the bag 27 accordingly inflates or deflates. Consequently, even though the bag 27 is arranged in the fuel tank 1, approximately the entire internal volume of the fuel tank 1 still can be used for storing fuel when the bag 27 is deflated. In addition, since the bag 27 occupies a large part of the upper space 28 of the fuel tank 1 when inflated, the amount of fuel vapor in the fuel tank 1 becomes small. This is because the fuel vapor in the upper space 28 is forced out of the fuel tank 1, via the vapor outlet 20, the connecting base 26, the vapor outlet 25, the valve ports 11, and the fuel vapor passage 6, into the canister 16 when the bag 27 is inflated. Consequently, the amount of fuel vapor escaping to the outside air via the small clearance between the fuel pump nozzle 10 and the seal member 8 becomes extremely small.

Figure 9:
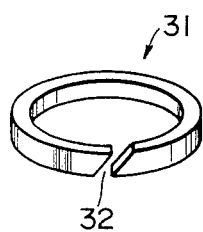
FIG. 9 is a perspective view of another embodiment of the seal member illustrated in FIGS. 1 through 8.
Figure 10:
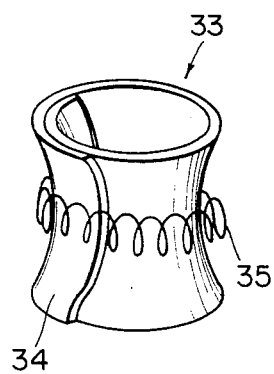
FIG. 10 is a perspective view of a further embodiment of the above seal member.
Figure 11:
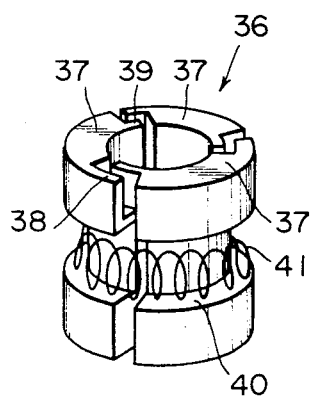
FIG. 11 is a perspective view of a still further embodiment of the above seal member.

FIGS. 9 through 11 illustrate separate embodiments of the seal member 8 illustrated in FIGS. 1 through 8. In the embodiment illustrated in FIG. 9, the seal member 31 is formed by a metallic ring, such as a piston ring, having a cutaway portion 32.

In the embodiment illustrated in FIG. 10, the seal member 33 has a shape such that a spring plate 34 is cylindrically wound in such a manner that the opposite ends thereof overlap. In addition, the middle portion of the cylindrical outer wall of the spring plate 34 is concaved, and a spring 35 is arranged around the concave portion.

In the embodiment illustrated in FIG. 11, the seal member 36 comprises three segments 37 each having the same shape. Each of the segments 37 has projections 38, 39 at the opposite ends thereof, and the projection 38 of each segment 37 overlaps the projection 39 of each adjacent segment 37. Grooves 40 are formed on the outer walls of the segments 37, and a spring 41 is arranged in the grooves 40, to hold the segments 37 in close but expandable contact with each other. Since the seal members 31, 33 and 36 illustrated in FIGS. 9, 10 and 11, respectively, are made of a metallic material, it is possible to improve the durability of the seal member as compared with the case where an O ring is used.

According to the present invention, even if the cap 3 is accidentally left detached from the fuel inlet pipe 2, there is no danger that the fuel vapor in the fuel tank 1 will escape to the outside air. In addition, after the fuel pump nozzle 10 is inserted into the nozzle insertion passage 9, there is no danger that the fuel vapor in the fuel tank will escape to the outside air. However, when the fuel pump nozzle 10 is first inserted into the fuel insertion passage 9, or removed therefrom, a small amount of the fuel vapor in the fuel tank 1 will escape to the outside air. However, the time necessary for the insertion or the removal of the fuel pump nozzle is short, and the amount of fuel vapor escaping to the outside air at this time is extremely small. Consequently, it is possible to prevent air pollution caused by the escape of fuel vapor from the fuel tank 1.

While the invention has been described by reference to specific embodiments chosen for purposes of illustration, it should be apparent that numerous modifications could be made thereto by those skilled in the art without departing from the basic concept and scope of the invention. The invention in its broader aspects is, therefore, not limited to the specific details, representative apparatus, and illustrative examples shown and described hereinabove. Thus, it is intended that all matter contained in the foregoing description or shown in the accompanying drawings shall be interpreted as illustrative and not in a limiting sense.

We claim:

1. A fuel tank for use in a motor vehicle, comprising:
    a fuel inlet pipe connected to the fuel tank and having a fuel inlet into which a fuel pump nozzle is inserted;
    a cap detachably attached to said fuel inlet;
    a canister having activated carbon contained therein;
    a hollow cylindrical nozzle guide in said fuel inlet pipe, said nozzle guide having a valve port thereon, said nozzle guide defining a nozzle insertion passage therein and defining a fuel vapor passage between the nozzle guide and the fuel inlet pipe, said vapor passage in communication with said canister, the interior of the fuel tank being connected to the canister via the valve port and the fuel vapor passage; and
    valve means for controlling the vapor connection between the interior of the fuel tank and the canister, said valve means biased to close both said valve port and said nozzle insertion passage, said valve means being openable by the insertion of the fuel pump nozzle into the nozzle insertion passage to open both said valve port and said nozzle insertion passage.

2. A fuel tank according to claim 1, wherein said fuel inlet pipe is open to an upper interior of said fuel tank.

3. A fuel tank according to claim 1, further comprising a flexible air bag arranged in the fuel tank.

4. A fuel tank for use in a motor vehicle, comprising:
    a fuel inlet pipe connected to the fuel tank and having a fuel inlet into which a fuel pump nozzle is inserted;
    a cap detachably attached to said fuel inlet;
    a canister having activated carbon contained therein;
    a hollow cylindrical nozzle guide in said fuel inlet pipe, said nozzle guide having a valve port thereon, said nozzle guide defining a nozzle insertion passage therein and defining a fuel vapor passage between the nozzle guide and the fuel inlet pipe, said cylindrical nozzle guide including sealing means for sealingly contacting the outer wall of the fuel pump nozzle to prevent fuel vapor from escaping through the nozzle insertion passage, said vapor passage in communication with said canister, the interior of the fuel tank being connected to the canister via the valve port and the fuel vapor passage; and
    valve means for controlling the vapor connection between the interior of the fuel tank and the canister, said valve means biased to close both said valve port and said nozzle insertion passage, said valve means being openable by the insertion of the fuel pump nozzle into the nozzle insertion passage to open both said valve port and said nozzle insertion passage.

5. A fuel tank according to claim 4, wherein said hollow cylindrical nozzle guide has an annular end plate on which said valve port is formed, and wherein said valve means comprises a control valve pivotally connected to said annular end plate and biased towards a closed position by a spring.

6. A fuel tank according to claim 5, wherein said annular end plate extends perpendicular to an axis of said fuel inlet pipe.

7. A fuel tank according to claim 5, wherein said annular end plate extends at an oblique angle relative to an axis of said fuel inlet pipe.

8. A fuel tank according to claim 4, wherein said nozzle guide has a funnel-shaped inlet portion.

9. A fuel tank according to claim 4, wherein said nozzle guide has an annular groove formed on an inner wall thereof, said sealing means being fitted into said annular groove.

10. A fuel tank according to claim 9, wherein said seal member is an O ring.

11. A fuel tank according to claim 9, wherein said seal member is a metallic ring having a cutaway portion.

12. A fuel tank according to claim 9, wherein said seal member comprises a spring plate wound in such a manner that opposite ends thereof overlap, and a spring arranged around said wound spring plate.

13. A fuel tank according to claim 12, wherein said spring plate has a concaved outer wall.

14. A fuel tank according to claim 9, wherein said seal member comprises a plurality of segments each having projections at opposite ends thereof, said projection of each said segment overlapping said projection of each said adjacent segment, a spring being arranged around said segments.

15. A fuel tank according to claim 14, wherein grooves are formed on outer walls of said segments, and said spring is arranged in said grooves.

16. A fuel tank according to claim 4, wherein said fuel inlet pipe extends to a bottom interior of said fuel tank.

17. A fuel tank according to claim 16, wherein said fuel tank has a small chamber expanding downward from a bottom wall of said fuel tank, said fuel inlet pipe extending to an interior of said small chamber.

18. A fuel tank according to claim 16, wherein said fuel inlet pipe has a fuel vapor outlet which is open to an interior, of said fuel inlet pipe at a position adjacent to said valve means, said fuel vapor outlet also being connected to an upper interior of the fuel tank.

19. A fuel tank according to claim 16, wherein an upper space of the fuel tank is directly connected to said canister.

20. A fuel tank according to claim 4, wherein said bag has an upper end portion which is fixed in an air-tight manner to an upper wall of said fuel tank, an interior of said bag being connected to the outside air for permitting the upward and downward movement of said bag in accordance with a change in the level of fuel in the fuel tank.

21. A fuel tank according to claim 20, wherein said bag has a flat plate fixed to an inner bottom wall thereof.

* * * * *